United States Patent [19]
McLaren

[11] Patent Number: 5,954,346
[45] Date of Patent: Sep. 21, 1999

[54] HYDRAULIC CHUCK

[75] Inventor: Gordon Leonard McLaren, North Bay, Canada

[73] Assignee: Boart Longyear Inc., North Bay, Canada

[21] Appl. No.: 08/939,825

[22] Filed: Sep. 29, 1997

[51] Int. Cl.[6] .................................................... B23B 5/22
[52] U.S. Cl. ........................ 279/4.12; 279/4.09; 279/65
[58] Field of Search ............................... 279/4.12, 4.01, 279/4.09, 4.07, 60, 65

[56] References Cited

U.S. PATENT DOCUMENTS

| | | | |
|---|---|---|---|
| 2,906,540 | 9/1959 | Butterworth et al. | 279/4.01 |
| 3,692,320 | 9/1972 | Lindelof et al. | 279/4.01 |
| 5,125,776 | 6/1992 | Muller et al. | 279/4.01 |

*Primary Examiner*—Andrea L. Pitts
*Assistant Examiner*—Monica Smith
*Attorney, Agent, or Firm*—Ladas & Parry

[57] ABSTRACT

A hydraulic chuck for a drill string has a hydraulic actuator to operate the jaws. The actuator remains stationery while the spindle is rotated and a pair of skirts attached to the actuator cover the bearing assemblies. The jaws are supported in slots in the spindle and are part cylindrical to reduce stress in the spindle. The chuck is secured to a drive unit by bolts received in open slots in an attachment flange to facilitate attachment of the chuck after routine maintenance.

26 Claims, 6 Drawing Sheets

HYDRAULIC CHUCK

FIELD OF THE INVENTION

The present invention relates to a hydraulic chuck for rotating a drill string.

BACKGROUND OF THE INVENTION

In order to bore holes into the earth to investigate geological structures, it is usual to utilize a drill string that carries a drill bit at one end. The drill string is made up of a number of drill rods threaded together with each of the drill rods typically being in the order of ten feet in length. In order to drill the hole, the drill rod must be rotated and this is typically performed by a drill rig that allows the rods to be assembled end to end and also rotates.

Rotation is imparted to the rods by a drill chuck that engages the outer surface of the rod and transmits torque from a drive unit to the rod. The position of the chuck on the rod must be adjustable so that as the string penetrates the ground, the chuck can be released, moved along the rod, and re-engaged. These operations are under control of the driller who utilizes considerable expertise to maintain the rate of drilling as high as possible.

One of the principle factors affecting the drill penetration rate is the rotational speed of the drill string. The rotational rate of the drill string is governed in part by the capacity of the bearings that support the chuck and allow it to rotate. Generally speaking, the larger the diameter of the bearing, the lower its rated speed and therefore it is important to provide a chuck in which the supporting bearings are maintained at a minimum diameter.

Conventionally, the chucks are moved between open and closed positions utilizing a hydraulic actuator that operates on the jaws incorporated in the chuck to engage and release the drill rod. The hydraulic actuator is maintained stationary while the jaw assembly rotates with the drill string and bearings are therefore provided to permit this relative rotation. Conventionally, these are the principal bearings used to support the chuck for rotation and therefore it is their diameter that limits the rotational speed of the chuck.

The chucks operate in an adverse environment where they are likely to be exposed to mud, water and abrasive dust together with extremes of temperature. It is therefore important to provide an optimum environment for the bearings to avoid premature failure. Many arrangements have been proposed for incorporating the hydraulic motor into the bearing arrangement but these have tended to result in arrangements in which the bearing diameter is increased and the bearings are left exposed to the environment.

DESCRIPTION OF THE PRIOR ART

One such arrangement is shown in U.S. Pat. No. 4,844,489 to William L. Acker in which a bearing assembly is mounted on a piston of the hydraulic actuator. The jaws are biased by springs into engagement with the rod and in the engaged position, the bearing is received within the cylinder. When the jaws are retracted, the bearing is exposed and although a cover is provided over the bearing, any contamination passing by the cover will be forced into the bearing as the jaws move into an engaged position. This contamination will be carried into the cylinder and cause detrimental wear on the seals.

SUMMARY OF THE INVENTION

It is therefore an object of the present invention to provide a hydraulic chuck in which the above disadvantages are obviated or mitigated.

In general terms, the present invention provides a hydraulic chuck for rotating a drill string. The chuck includes a tubular spindle to receive the drill string with a jaw assembly mounted on said spindle for rotation therewith. The jaw assembly includes a plurality of jaws each radially adjustable to engage a drill string received in said spindle. A motion translator is operable upon the jaws and is axially moveable relative to said spindle to cause radial displacement of said jaws. A hydraulic actuator including a cylinder and a piston reciprocal in the cylinder is operable between said spindle and the motion translator to control axial displacement of said motion translator. A first bearing is located between the actuator and the spindle to permit relative rotation therebetween. The actuator includes a shield located radially outwardly of the bearing and extending axially toward the motion translator to be juxtaposed with said second bearing. The shield is axially displaceable relative to the spindle with reciprocation between the piston and cylinder so as to cover the second bearing during axial displacement of the motion translator.

BRIEF DESCRIPTION OF THE DRAWINGS

An embodiment of the invention will now be described by way of example only, with reference to the accompanying drawings, in which.

DETAILED DESCRIPTION OF THE PREFERRED EMBODIMENTS

Figure 1:
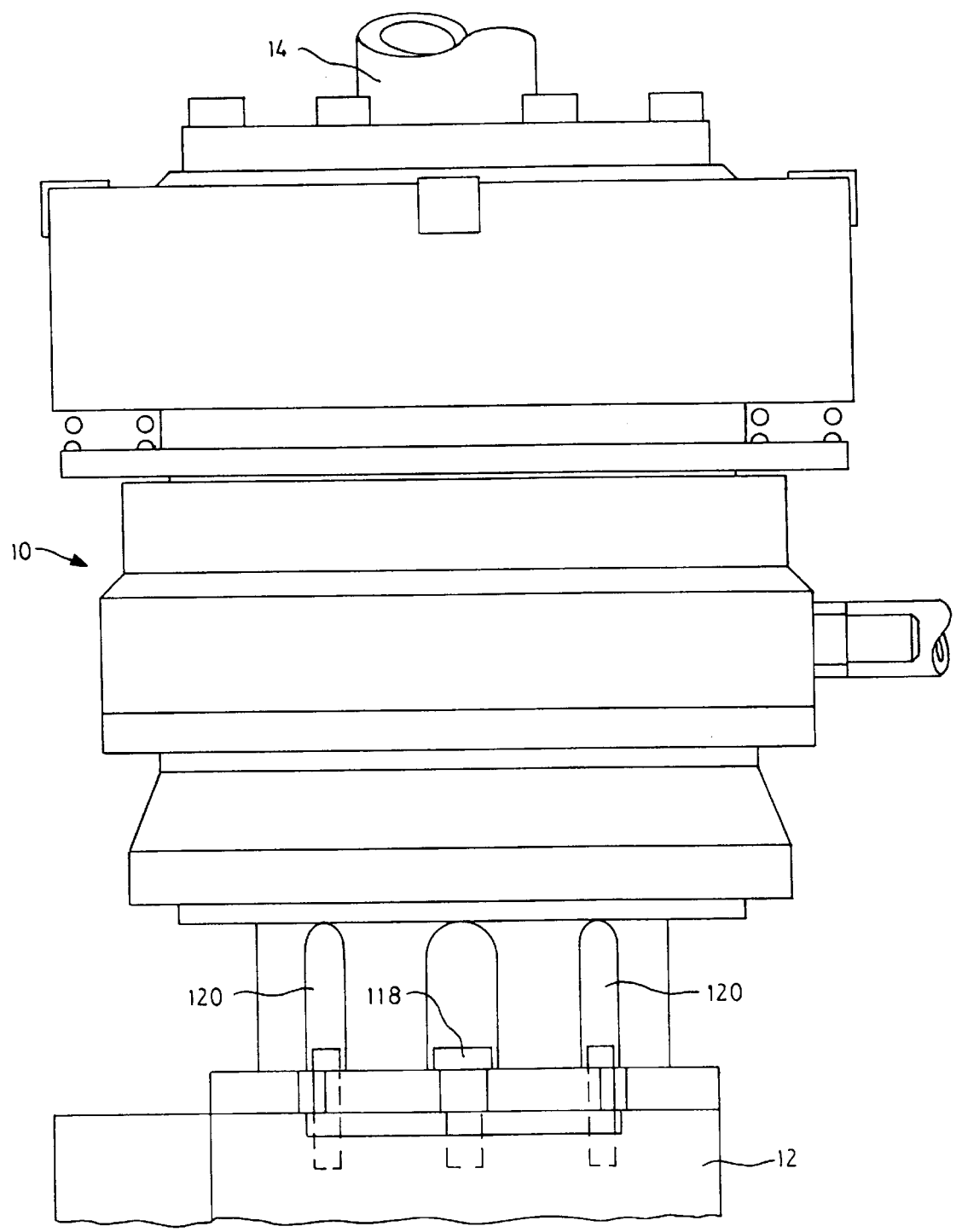
FIG. 1 is a front elevation of a chuck.

Referring therefore to FIG. 1, a hydraulic chuck 10 is connected to a drive unit 12 that receives power from a prime mover typically through a hydraulic transmission. The details of the drive unit are conventional and well-known in the art and therefore will not be described further.

The chuck 10 engages a drill rod 14 and transmits the torque from the drive unit 12 into the drill string of which the rod 14 forms one component.

Figure 2:
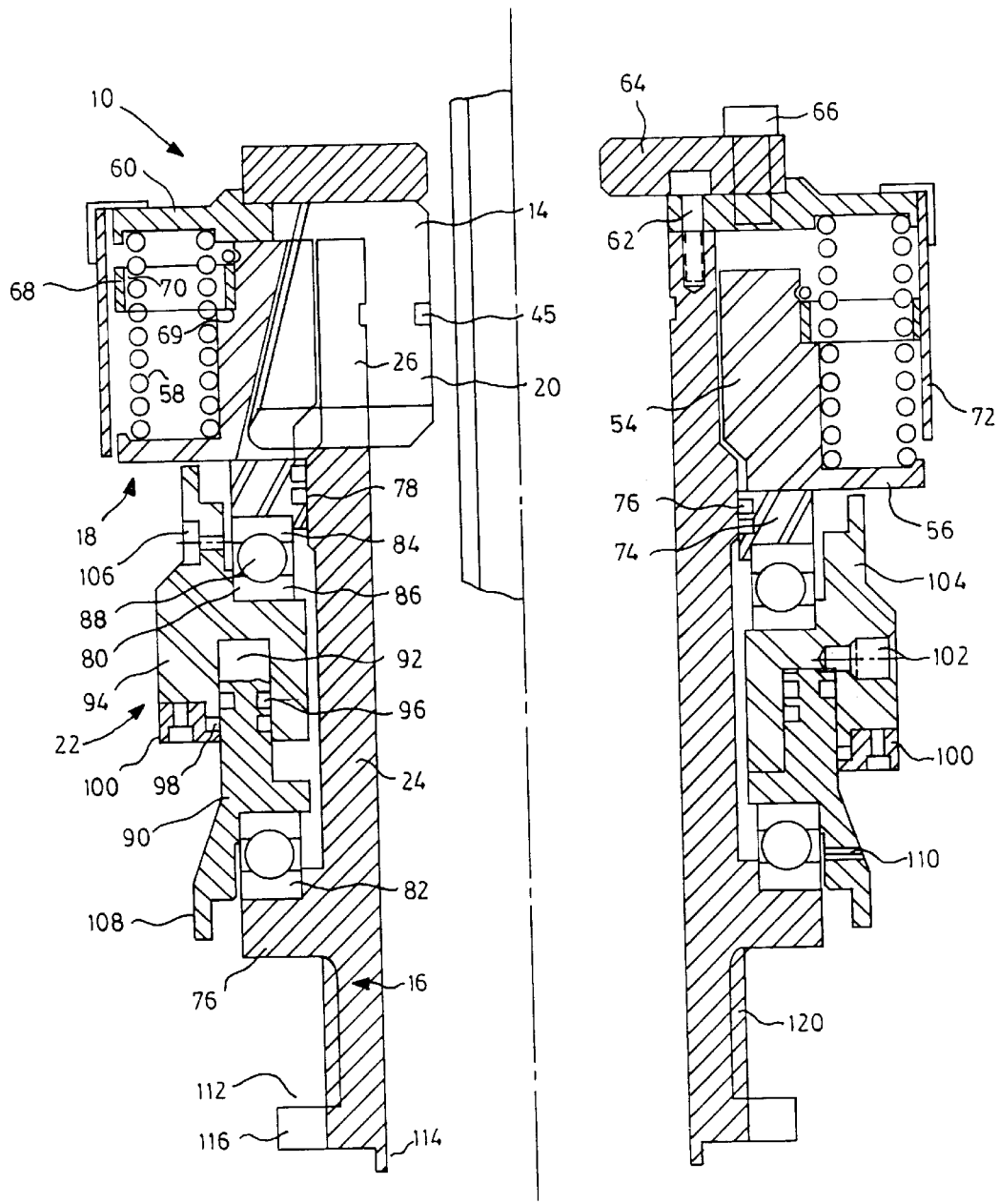
FIG. 2 is a longitudinal section through the chuck of FIG. 1 showing the components in both open and engaged positions.

As can best be seen in FIG. 2, the chuck 10 includes a spindle 16 and a jaw assembly 18 that is rotated with the spindle 16. The jaw assembly 18 includes a set of jaws 20 that are circumferentially disposed about the spindle and are adapted to engage the outer surface of the drill rod 14.

A hydraulic actuator 22 is disposed about the spindle 16 and operates upon the jaw assembly 18 to move the jaws between the engaged position shown in the left-hand side of FIG. 2 and the open position shown on the right-hand side of FIG. 2.

Figure 3:
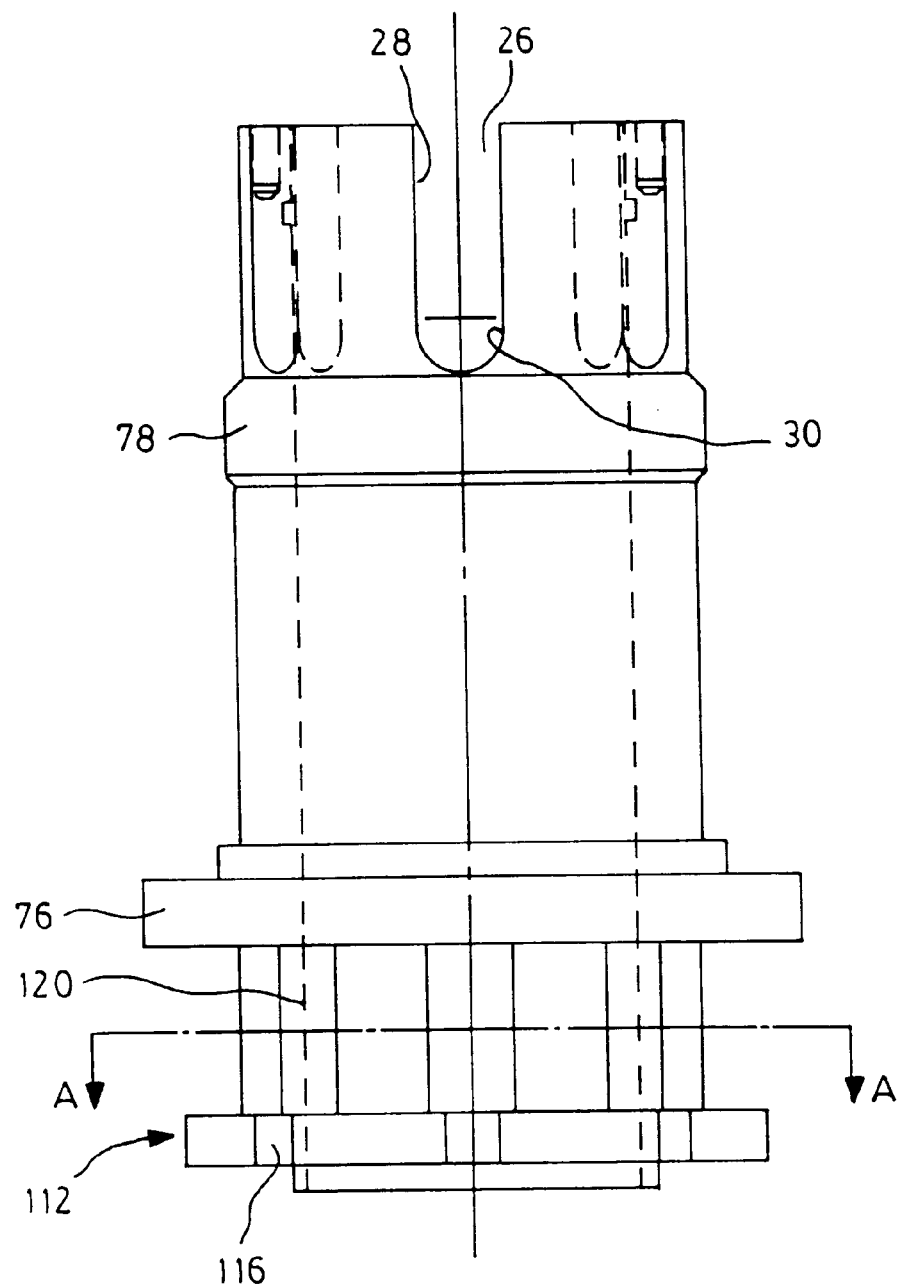
FIG. 3 is a front elevation of a spindle used in the chuck of FIGS. 1 and 2.
Figure 8:
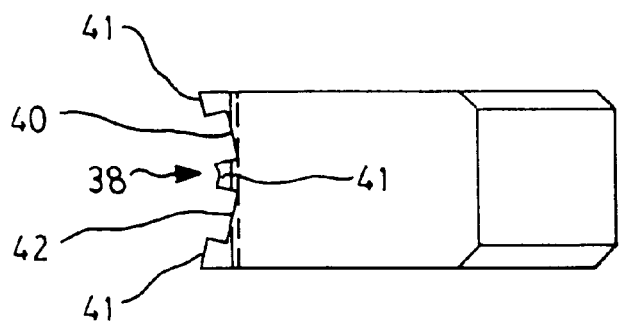
FIG. 8 is a plan view of the jaw of FIG. 7.
Figure 9:
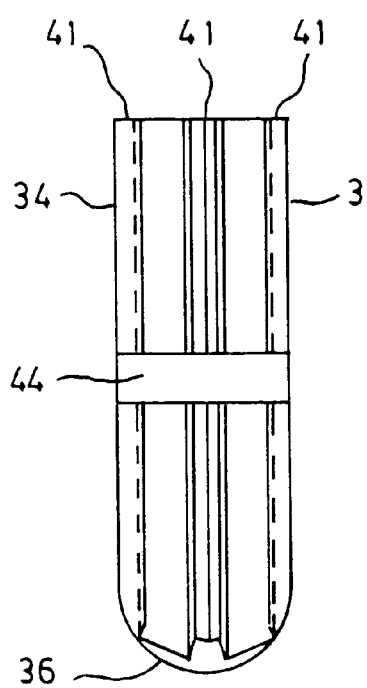
FIG. 9 is a front elevation of the jaw of FIG. 7.
Figure 7:
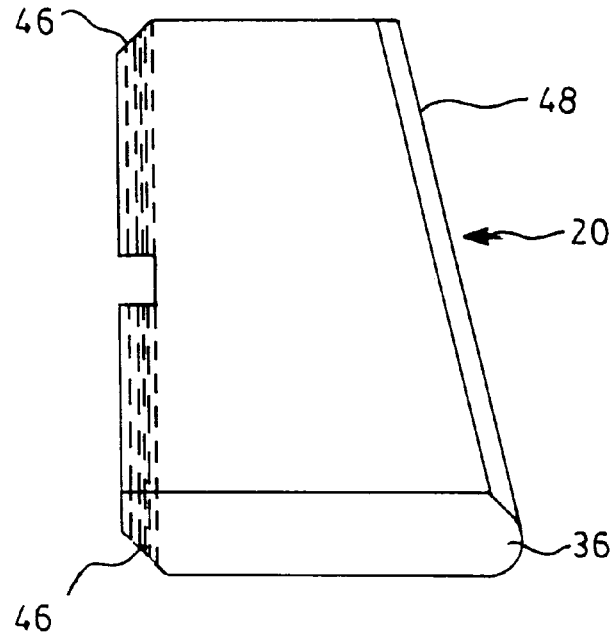
FIG. 7 is a side view of a jaw used in the truck of FIG. 1.

The spindle 16 includes a tubular body 24 that is castellated at one end by a set of support slots 26. The support slots 26 are circumferentially spaced about the spindle and each supports a respective one of the jaws 20. Referring to FIG. 3, the slots 26 have a pair of flanks 28 interconnected by a part cylindrical curved surface 30. The jaws 20 have a complementary cross-section shown more clearly in FIGS. 7–9 with a pair of planar trapezoidal faces 32,34 interconnected by a part cylindrical face 36. A radially inner face 38 of the jaw 20 is concave and has a pair of longitudinal slots 40,42 running from top to bottom. The slots 40,42 receive carbide inserts 41 that project from the face 38 to ensure an effective engagement of the rod. The face 38 is further segmented by a transverse groove 44 which accommodates a release spring 45 (FIG. 2). Opposite ends of the face 38 are chamfered as indicated at 46 to provide a lead-in for the drill rod 14 as it is fed through the spindle 16.

The radially outer face 48 of the jaw 20 is inclined to the longitudinal axis of the chuck and engages a sloped back wall 50 of slots 52 formed in a support ring 54. The ring 54 is one form of a motion translator that forms part of the jaw assembly 18 and has the slots 52 circumferentially spaced to correspond with the support slots 26 on the spindle 16. The ring 54 has a radial flange 56 that supports one end of springs 58 uniformly distributed about the spindle 16. The opposite end of springs 58 bear against a cap 60 that is bolted to the spindle body 24 by cap screws 62. Axial movement of the jaws 20 out of the support slots 26 is limited by a keeper plate 64 bolted to the cap 60 by screws 66.

An annular ring 68 is located on shoulder 69 at one end of the ring 54 and has throughbores 70 to receive respective ones of the springs 58. The ring 68 therefore provides support for each of the springs intermediate its ends and inhibits lateral displacement of the springs. A cover 72 is secured to the cap 60 and extends around the springs to the flange 56 to cover the springs when in a closed position.

The ring 54 is slidably mounted on the body 24 by guide ring 74. The guide ring 74 carries a pair of nylon slip rings 76 that slide along a shoulder 78 projecting radially outwardly from the body of the spindle 16. The guide ring 74 engages the underside of the ring 54 to move it against the bias of the springs 58.

The hydraulic actuator 22 is supported between a shoulder 76 formed on the body 24 and the guide ring 74 by a pair of bearings 80,82. The bearings 80,82 are roller bearings having a pair of races 84,86 separated by the ball bearing 88. The bearings 80,82 therefore permit relative rotation between the spindle and the actuator 22.

The actuator 22 includes an annular piston 90 that is reciprocal within a chamber 92 formed in an annular cylinder 94. Seals 96 are provided between the piston 90 and the chamber 92 and wiper seals 98 are secured against the radially outer surface of the piston 90 by means of a retaining plate 100. Hydraulic fluid is supplied to the chamber 92 through an inlet 102 and fluid is expelled from the chamber under the action of the springs 58 through the port 102.

To provide a shield for the bearing 80, a skirt 104 extends upwardly from the cylinder 94 to the underside of the flange 56. The skirt 104 extends across the face of the bearing 80 and terminates in close proximity to but not in engagement with the flange 56. A lubrication port 106 is provided in the skirt 104 to allow lubricant to be supplied to the bearing 80.

In a similar manner, a skirt 108 extends downwardly from the piston 90 across the bearing 82. Lubrication ports 110 are provided in the skirt 108 to provide lubricant to the bearing 82. Each of the skirts 104,108 is fixed to the actuator 22 and therefore remains stationary while the spindle 16 rotates.

Figure 4:
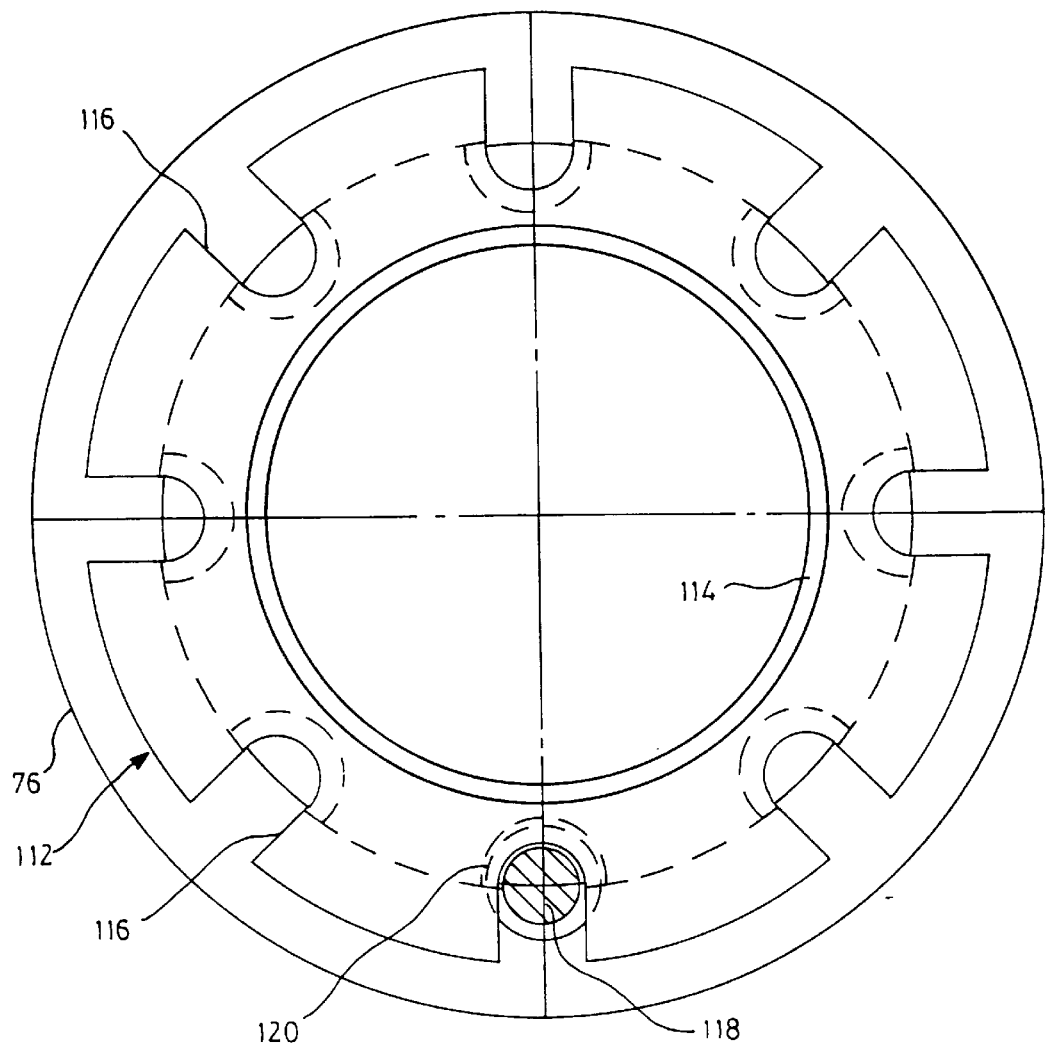
FIG. 4 is an end view of the spindle of FIG. 3.
Figure 5:
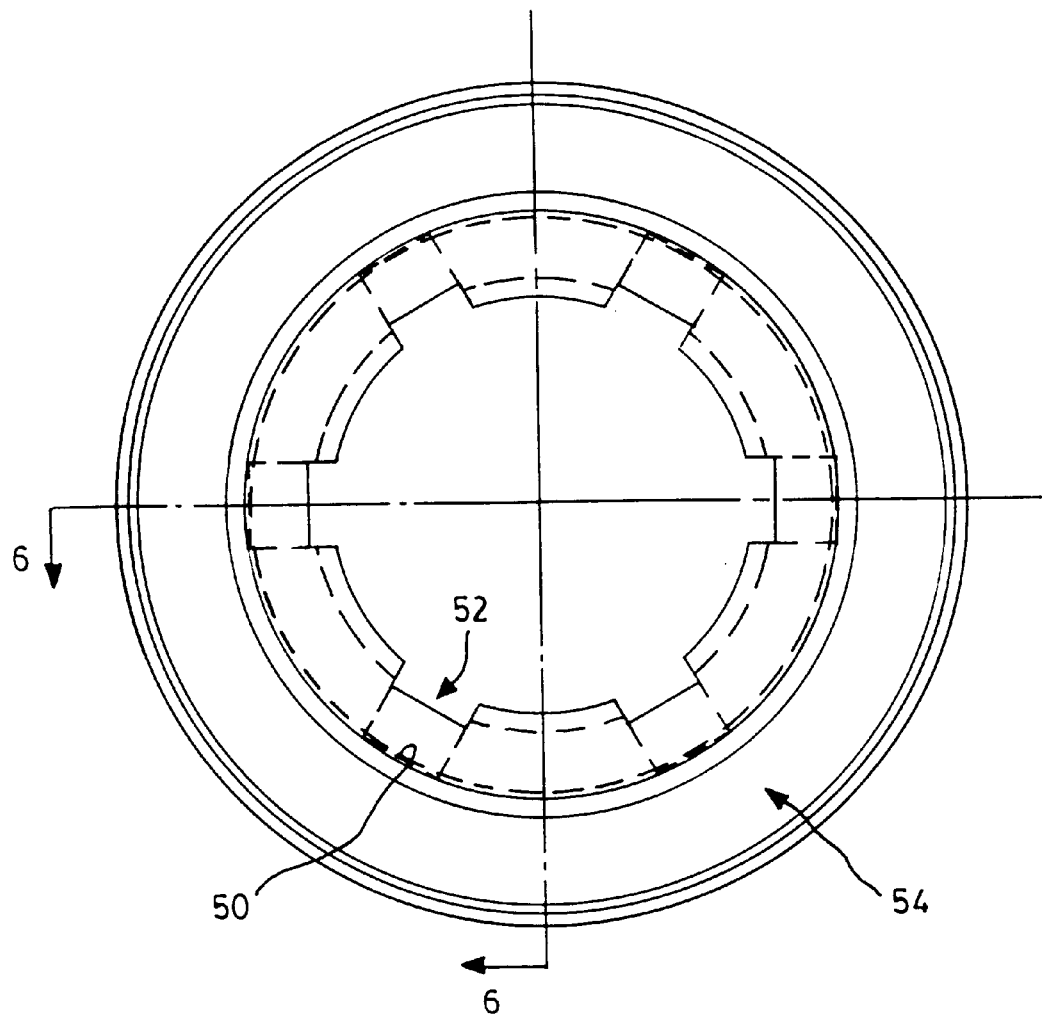
FIG. 5 is a plan view of a component used to support jaws in the chuck of FIG. 1.
Figure 6:
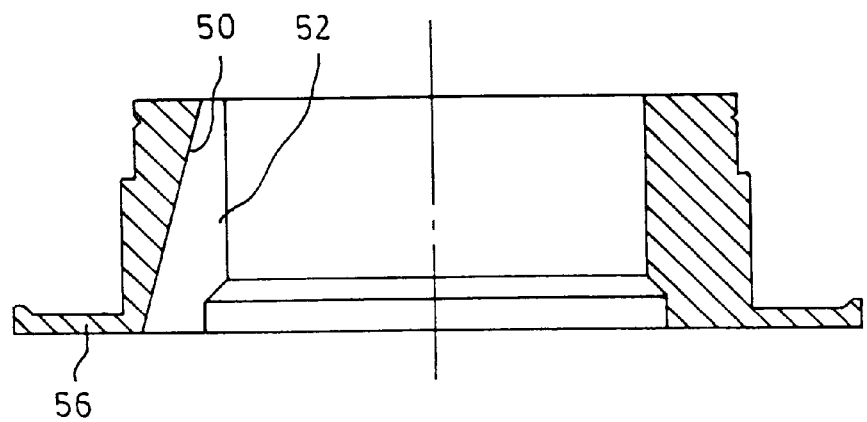
FIG. 6 is a view on the line VI—VI of FIG. 5.

A flange 112 is provided on the lower end of the body 24 of the spindle 16 with a pilot spigot 114 projecting axially from below the flange 112. As can best be seen from FIG. 4, the flange 112 includes radial recesses 116 to receive bolts 118 and secure the chuck 10 to the drive 12. The radially outer surface of the body 24 is fluted as indicated at 120 adjacent the recesses 116 to receive the heads of the bolts 118. The flange 116 is spaced from the shoulder 76 sufficiently to allow the bolts 118 to be removed. The provision of the open-ended recesses 116 permits the flange 112 to be located onto one of the bolts 118 and the spigot 114 engaged with the drive 12 as the chuck is mounted on the drive. This greatly facilitates removal and replacement of the chuck during routine maintenance.

In operation, with the chuck mounted on the drive, hydraulic fluid is supplied to the chamber 92. The piston 90 is axially retained by the shoulder 76 and therefore the cylinder 94 moves axially and displaces the guide ring 74. The guide ring carries the support ring 54 and compresses the springs 58 until the guide ring abuts the cap 60. In this position, the inclined rear face 50 allows the jaws 20 to slide radially outwardly under the influence of the release spring 45 so that the jaws are at a maximum diameter.

The drill rod 14 is thus released by the jaws 20, allowing the chuck 10 to be moved axially along the drill rod or for the rod 14 to be removed from the chuck. Once the chuck is repositioned, hydraulic fluid is released from the chamber 92 and the springs 58 force the piston 94 down to expel the fluid from the chamber 102. As the springs 58 move the support ring 54 axially, the inclined rear face 50 translates the axial movement into radial movement of the jaw 20 forcing it against the surface of the drill ring 14. Once engaged, the drive unit may be operated and the spindle 16 rotated to rotate the drill rod 14. As the spindle 16 rotates, the bearings 80,82 allow the actuator 22 to remain stationary.

It will be noted that the piston 94 moves with the bearing 8,0 and the support ring 54 so that the gap between the skirt 104 and the flange 56 remains constant. In this way, during opening and closing of the chuck, the bearing 80 remains covered by the skirt 104 at all times and contaminant cannot readily move into the void between the skirt 104 and flange 56. Moreover, because there is no change in the internal volume of the void between the skirt 104 and the guide ring 74, repeated operation of the actuator 22 will not pump any contaminants into the bearing. Any contaminants that do enter between the skirt 54 and flange 56 are likely to be expelled once the chuck rotates and thereby further protects the bearing 80. If preferred, seals may be located on the skirts to contain the lubricant which may then be an oil rather than a grease.

The torque is transmitted from the spindle 16 into the jaws 20 through the flanks 28 of the slots 26. The jaws 20 are a sliding fit within their respective slots and the part cylindrical end faces 30 serve to avoid high stress concentrations in the spindle 16. The curved surface also provides a greater bearing area for axial loads imposed on the jaws 20 and thereby contributes to the increased life of the jaws 20 and spindle 16.

By virtue of the arrangement of the bearings 80,82 on the spindle and the disposition of the hydraulic actuator between the bearings, it is possible to locate the bearings 80,82 adjacent the body 24 of the spindle 16. This enables the bearings 80,82 to be of relatively smaller diameter which may therefore run at a higher speed and, coupled with the favourable environment provided for the bearings by the protection afforded by the skirts 104,108, an increased bearing life and higher loads may be contemplated.

The embodiments of the invention in which an exclusive property or priviledge is claimed are defined as follows:

1. A hydraulic chuck for rotating a drill string comprising a tubular spindle, a jaw assembly located on said spindle and including a plurality of jaws radially moveable to engage a drill rod, and a hydraulic actuator operable between said spindle and said jaw assembly to cause radial displacement of said jaws, said spindle including a radial flange having a plurality of recesses extending from the periphery thereof to receive fasteners to secure said spindle to a drive unit and a spigot projecting from said flange to locate said spindle relative to said drive unit.

2. A hydraulic chuck according to claim 1 wherein said jaw assembly includes a plurality of jaws each radially adjustable to engage said drill string and a motion translator operable upon said jaws and axially moveable relative to said spindle to cause radical displacement of said jaws, said hydraulic actuator being operable between said spindle and said motion translator to control axial displacement of said motion translator, a first bearing located between said actuator including a shield located radially outwardly of said bearing and extending axially toward said actuator to be juxtaposed said a second bearing, said hydraulic actuator including a cylinder and a piston reciprocal in said cylinder, said shield being axially displaceable relative to said spindle with reciprocation between said piston and cylinder so as to cover said second bearing during axial displacement of said motion translator.

3. A chuck according to claim 2 wherein said actuator includes a second shield extending over said first bearing and located radially outward therefrom.

4. A chuck according to claim 2 wherein said actuator is annular and disposed about said spindle and said shield is an annular skirt.

5. A chuck according to claim 4 wherein said motion translator includes a guide ring slidably mounted on said spindle and engageable by said bearing and a motion transfer device operable between said ring and each of said jaws to translate axial motion of said ring to radial motion of said jaws.

6. A chuck according to claim 5 wherein said motion transfer device includes a support having a plurality of slots formed therein to receive respective ones of said jaws, said slots having an inclined face engageable with a radially outer face on said jaws to impart radial motion thereto.

7. A chuck according to claim 6 wherein said second bearing is mounted on a shoulder formed on said cylinder and a flange projects from said shoulder.

8. A chuck according to claim 6 wherein said radially outer face is inclined to engage said inclined face of said slots.

9. A chuck according to claim 8 wherein said ring is biased to move said jaws to a radially inner position and into engagement with a drill string.

10. A chuck according to claim 9 wherein said ring is biased by a set of springs circumferentially spaced about said spindle.

11. A chuck according to claim 10 wherein said springs act between a radially extending flange secured to said spindle and a radially extending flange secured to said ring and a keeper is located between said flanges to inhibit radial displacement of said springs between said flanges.

12. A chuck according to claim 11 wherein said keeper includes an annular plate having circumferentially spaced bores therein to receive respective ones of said springs.

13. A chuck according to claimed 8 wherein said jaws are slidably supported in support slots formed on said spindle, said slots having a cross section corresponding to that of said jaws.

14. A chuck according to claim 13 wherein said jaws have a pair of oppositely directed planar faces interconnected by a radially extending part cylindrical face, said part cylindrical face being supported on a part cylindrical surface in said support slots to inhibit relative axial movement between said jaws and said spindle.

15. A chuck according to claim 14 wherein said planar faces are interconnected by a radially inwardly directed face engageable with a drill string and said inwardly directed face includes a pair of axial grooves extending between opposite ends of said jaw.

16. A chuck according to claim 15 wherein opposite ends of said inwardly directed face is chamfered.

17. A chuck according to claim 2 wherein said spindle has a flange at one end thereof for connection to a drive unit and a lip projecting axially from said flange and concentric with said spindle, said flange having a plurality of radial recesses extending inwardly from a periphery of said flange to receive bolts for connection to said drive unit.

18. A chuck according to claim 17 wherein said first bearing is located on a shoulder projecting radially from said spindle and said flange is spaced from said shoulder sufficient to permit insertion of fasteners to secure said flange to said drive unit.

19. A chuck according to claim 18 wherein said spindle has flutes aligned with said recesses to accommodate said fastenings.

20. A hydraulic chuck according to claim 1 wherein a motion translator is operable upon said jaws and axially movable relative to said spindle to cause radial displacement of said jaws said hydraulic actuator being operable between said spindle and motion translator to control axial displacement thereof, said spindle including a plurality of axially extending support slots, and each receiving a jaw having oppositely directed faces interconnected by an end face positioned in sliding relationship with an end face of said slot whereby said support slots support said jaws for radial sliding movement relative to said spindle.

21. A hydraulic chuck according to claim 20 wherein said oppositely directed faces are interconnected by a radially inwardly directed face and a pair of circumferentially spaced inserts are located on said face to be engageable with a drill string.

22. A hydraulic chuck according to claim 21 wherein opposite ends of said radially inwardly directed face is chamfered.

23. A jaw for use in a hydraulic chuck for rotating a drill string, said jaw having a pair of oppositely directed planar faces, said faces being trapezoidal having a pair of spaced parallel edges and wherein a pair of edges extending between said parallel edges are interconnected by an inwardly concave face having a pair of grooves extending parallel to said pair of edges, each of said grooves having an insert located therein to project radially inwardly beyond said face for engagement with said drill string.

24. A jaw according to claim 23 wherein opposite ends of said inwardly concave face are chamfered.

25. A chuck according to claim 1 wherein flutes are provided in said spindle to allow axial movement of said fasteners.

26. A chuck according to claim 25 wherein a shoulder is spaced from said flange to support said actuator, said shoulder being spaced sufficiently to permit said fasteners to be removed from said drive unit without separation of said chuck therefrom.

* * * * *